(No Model.)

T. W. MORAN.
STEAM COUPLING FOR RAILWAY CARS.

No. 422,311. Patented Feb. 25, 1890.

WITNESSES
Mary Byhew
Villette Anderson.

INVENTOR
Thomas W. Moran
by E. W. Anderson
Attorney

United States Patent Office.

THOMAS W. MORAN, OF LOUISVILLE, KENTUCKY, ASSIGNOR TO THE MORAN FLEXIBLE STEAM JOINT COMPANY, OF SAME PLACE.

STEAM-COUPLING FOR RAILWAY-CARS.

SPECIFICATION forming part of Letters Patent No. 422,311, dated February 25, 1890.

Application filed October 16, 1888. Serial No. 288,214. (No model.)

*To all whom it may concern:*

Be it known that I, THOMAS W. MORAN, a citizen of the United States, and a resident of Louisville, in the county of Jefferson and State of Kentucky, have invented certain new and useful Improvements in Steam-Couplings for Railway-Cars; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
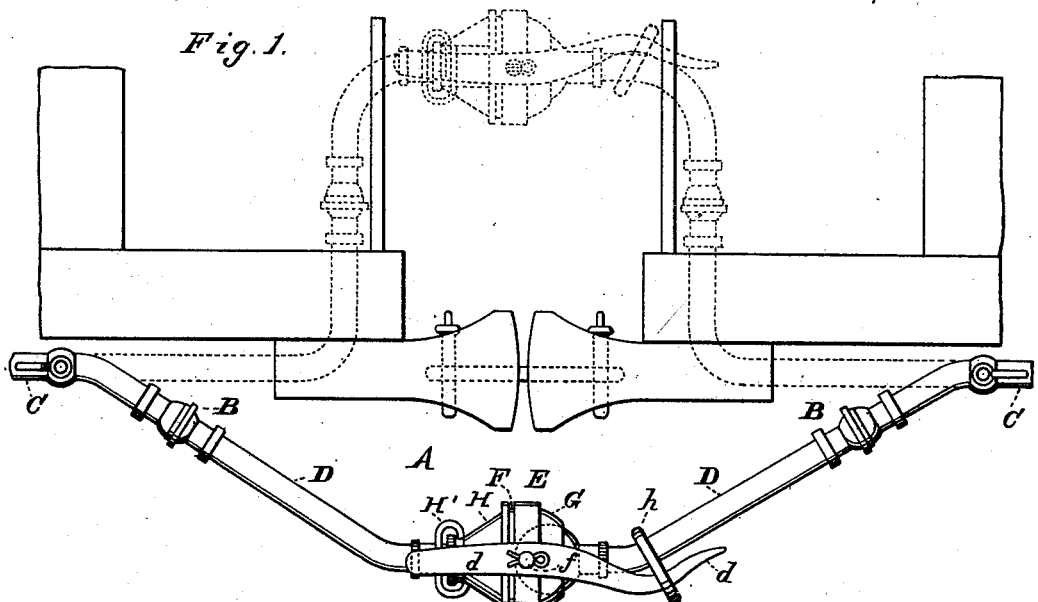
Figure 4:
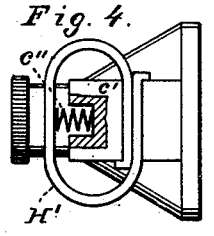
Figure 2:
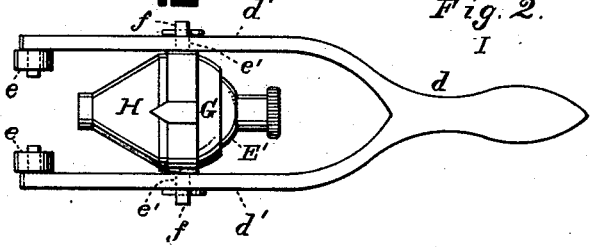
Figure 3:
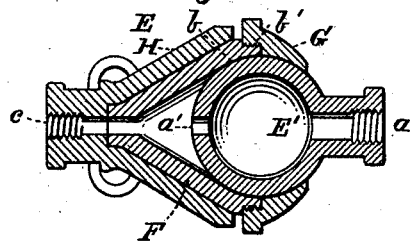

Figure 1 of the drawings is a representation of this invention and is a side view. Figs. 2, 3, and 4 are details.

This invention relates to improvements in couplings for steam-pipes; and it consists in the construction and novel combination of parts, as hereinafter set forth.

The object is to provide a coupling partially automatic in its operation for connecting the steam brake and heating pipes of railway-cars.

Referring to the drawings, A designates the metallic flexible coupling, having the universal joints B, connecting the steam-conveying pipes C and the short pipes D.

E is the coupling-joint, which consists of the hollow sphere E', having a threaded opening $a$ to engage the threaded end of one of the pipes D, and having an opening $a'$ opposite the opening $a$.

F is a conical shell, provided at its larger inner end with the bearing $b$, adapted to fit closely upon the outer surface of the sphere E', and having an externally-threaded portion $b'$ to engage the threaded portion of the coupling-ring G, which is designed to engage the sphere by means of its bearing portion.

H shows a conical shell or case having a threaded opening $c$ to connect with the short pipe D. The inner surface of the shell H is formed to fit over the shell F. On the outer side of the shell H are provided two recessed lugs $c'$, having the coiled buffer-springs $c''$ seated within the recess of said lugs.

H' shows elliptical or cam springs secured to the lugs $c'$, extending longitudinally around said lugs, and bearing by their inner face against the buffer-springs.

I is a coupling-lever, consisting of the stem $d$ and the arms $d'$. The arms $d'$ are provided with rollers, as at $e$, and openings $e'$ in said arms are provided to engage pivot-lugs $f$ on the coupling-ring.

When the shell H is placed over the shell F, the openings $e'$ in the arms being pivoted on the lugs $f$, by bringing the stem $d$ parallel with the short pipe, the inwardly-turned ends $e$ pass over the springs H' to the center thereof, thereby drawing the shells closely together and making the joint steam-tight.

A ring $h$ may be used to slide over the short pipe and stem, as shown, to hold the lever in place.

If desired, the coupling, instead of hanging below the level of the car-bottom, may arch upwardly, as shown in the dotted lines, to bring it within reach of the car-platform.

It will be observed that should the cars become separated by accident the coupling and connecting pipes will be drawn toward a horizontal position, and would then automatically disengage the inwardly-turned ends $e$ from the cam-springs and allow the coupling to separate.

Having described my invention, what I claim is—

1. The combination, with the steam-conveying pipes, of the flexible coupling consisting of the hollow sphere having the openings for the passage of the steam, the coupling-ring and conical bearing-shell surrounding said sphere, the outer bearing-shell having the springs, and a coupling-lever connected to the inner shell and coupling-ring, engaging said springs, substantially as specified.

2. The combination, with the hollow sphere, the coupling-ring surrounding said sphere and having the external pivot-lugs, the conical bearing-shell around the sphere, the outer shell, and its exterior springs, of the forked lever pivoted on the lugs of the ring, and having inwardly-turned ends adapted to engage the springs of the outer shell, substantially as specified.

3. The combination, with the steam-pipes and the short pipes connected therewith by universal joints, of the universal-joint coupling E, having the outer and inner conical bearing-shells, springs on the outer shell, and a connecting device adapted to engage said bearing-springs, substantially as specified.

4. In a flexible coupling, the combination, with the steam-conveying pipes, the short pipes, and the universal joints connecting the same together, of the hollow sphere having a threaded opening, the coupling-ring having pivot-lugs, the conical shell engaging said ring around said sphere, the outer conical shell having the recessed lugs, the buffer-springs, and bearing-openings, and the pivoted lever connected to the coupling-ring, having the inwardly-turned ends provided with rollers, substantially as specified.

5. In a flexible coupling, the combination, with the steam-pipes, the short pipes, and the universal joints connecting these parts together, of the universal coupling-joint connected to said short pipes and having outer and inner separable bearing-shells, and a lever-fastening adapted to hold said shells together, substantially as specified.

In testimony whereof I affix my signature in presence of two witnesses.

THOS. W. MORAN.

Witnesses:
AARON KOHN,
L. OPPENHEIMER.